May 31, 1932. F. C. McELROY 1,860,682
SWITCH FOR MOTOR VEHICLE DIRECTION SIGNALS
Filed April 7, 1926
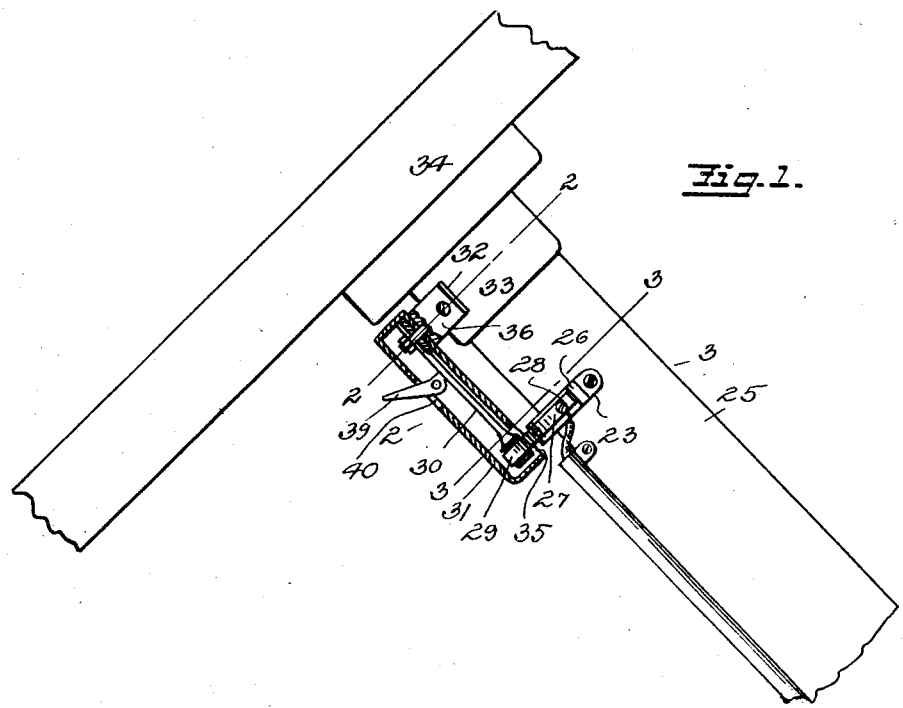
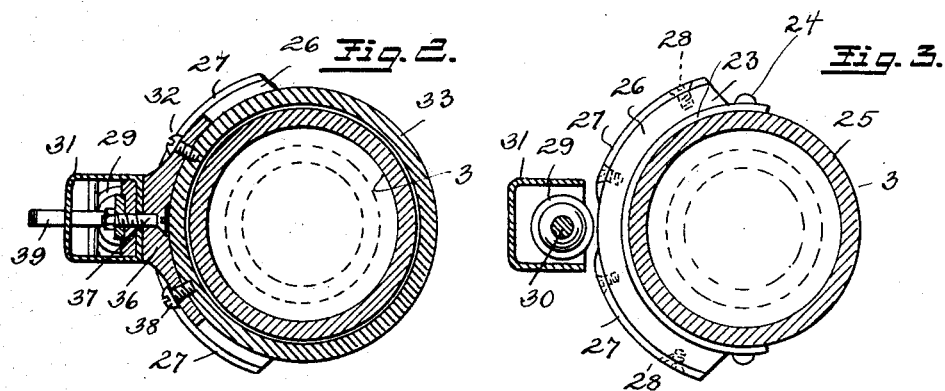
Inventor
Frank McElroy
By W. A. McHowell
Attorney Patented May 31, 1932

1,860,682

UNITED STATES PATENT OFFICE

FRANK C. McELROY, OF COLUMBUS, OHIO

SWITCH FOR MOTOR VEHICLE DIRECTION SIGNALS

Application filed April 7, 1926. Serial No. 100,411.

The object of the present invention is to provide an improved direction signal switch and means adaptable for use in connection particularly with motor vehicles whereby an automatically produced signal is displayed to notify an adjacent vehicle operator or observer that certain changes relative to the speed and direction of travel of the vehicle are about to be made or are being made with the end in view of avoiding traffic collisions or confusion due to changes in vehicle operations or in direction of travel.

To this end, the invention consists in the provision of a novel form of switch mechanism carried in conjunction with the steering column of a motor vehicle whereby upon the actuation of the steering column to turn the vehicle either to the right or the left, the switch mechanism will be closed to energize a signal mechanism automatically to indicate that the vehicle is turning either to the right or the left.

For a further understanding of the invention, reference is to be had to the following description and the accompanying drawings; in which:

Fig. 1 is a view partly in side elevation and in vertical section of the preferred form of switch mechanism used for the system in connection with the steering column of the vehicle, Fig. 2 is a transverse sectional view on the plane indicated by the line 2—2 of Fig. 1, and Fig. 3 is a similar view on the line 3—3 of Fig. 1.

In order to automatically operate direction signals of the type commonly found in connection with motor vehicles and arranged to the rear thereof, with the exception of the tail light signal, I provide switch mechanism of simple, positively acting and conveniently operated form. The switch mechanism designated generally by the numeral 2, comprises an arcuate base plate 23, which has its end secured as at 24 to the outer casing 25 of the steering column 3. Suitably mounted in connection with the base 23 is an arcuate block of insulating material, designated by the numeral 26. To the outer surface of the block 26, there is applied a pair of metallic contact strips 27, which are suitably secured as at 28 to the block. The adjacent end of these strips are separated, and normally positioned between the separate ends of said switch is a roller 29 rotatably mounted upon the lower end of a spring support 30. This support is mounted within a casing 31, which has the upper end thereof connected as at 32 to the hub 33 of the steering wheel 34, the hub being adapted to rotate with the casing 31. The lower portion of the casing 31 is provided with an opening 35, through which the roller 29 projects for cooperation with the contact strips 27, whereby if the steering wheel is rotated to the right or to the left, the roller 29 will engage selectively with said strip to complete independent circuit leading to the signal arm arranged at the rear of the vehicle to the signal line, not shown, at the rear of the vehicle. The upper end of the casing 31 is connected with an anchor block 36 secured to the hub 33, and a screw 37 or the like is employed to unite the casing with said block and also to hold the upper end of the support 30 in rigid connection with the casing, but to allow of resilient movement on the part of the lower end of said support. Screws 38 are used to directly connect the block 36 with the hub 33. If desired, the casing may be provided with a pivoted lever 39 for holding the roller 29 and its support 30 in position wherein the engagement of the roller with the strips 27 is very positive and provides for an efficient electrical connection. The lever 39 projects through a slot 40 in the casing for convenience in effecting its actuation. The inner end of the lever is provided with angularly directed flat surfaces, which engage with the support 30 so that due to the inherent resiliency of said support the lever will be retained in either of its adjusted positions.

It will be observed that when the vehicle is moving in a straight course the collar 29 is free of engagement with the strips 27, and therefore the switch mechanism is open preventing the illumination of the lamp of the signal. However, when the steering wheel is turned either to the right or the left, the roller 29 engages physically with the strips 27 so as to complete the circuit through one or the other of the signal lamps, whereby through this arrangement, which does not require any thought on the part of the vehicle operator, a signal is produced in the rear of the vehicle for the notification of approaching motorists.

In the installation of the signal, it has been found desirable in certain instances to place one of the contact strips 27, shown in the Fig. 3, a trifle nearer the roller 29 than the other complemental strip. This is done in order that the signalling unit may indicate left turns more promptly than right turns. This feature is particularly useful when passing vehicles on the left, or when in executing sudden left turns, while the vehicle is being driven at ordinary rates of speed.

In view of the foregoing, it will be seen that the present invention provides an effective signalling system for use in connection with motor vehicles for indicating instantly and automatically deviations or departures in the course of operation of the vehicle from a previous course which it had been pursuing. The arrangement is such that regardless of how the vehicle is changed in its course of operation, such departure will be indicated on the signalling unit, and this is performed without requiring any manual attention on the part of the operator and in a purely automatic manner.

It will be apparent that the driver of the vehicle, in the operation of the system, is not required to perform any additional manually executed operations in governing the operation of the system since the use of the latter is effected by the use of the ordinary vehicle controlling members, upon which the driver may concentrate his attention in the customary manner.

While I have described what I consider to be the preferred form of the invention, nevertheless, it will be understood that various changes may be made therein from time to time as practice may require without departing from the scope of the invention as set forth in the following claims.

What is claimed is:

1. A circuit closure for the purpose set forth, comprising a pair of spaced arcuate contact strips insulated from and secured to the steering post column of a motor vehicle, a resilient member having one end thereof secured to the hub of the steering wheel associated with said column, the other end of said member being equipped with a roller adapted to engage with said contacts upon the operation of said steering wheel to turn the vehicle out of the straight-away, straight-ahead position, and a manually operated lever pivotally connected in association with the steering wheel and adapted to flex the resilient member into engagement with said contacts, said lever when in one position permits the disengagement of the roller from said contacts.

2. A circuit closure for vehicle direction signals, comprising a pair of spaced arcuate contact strips insulatively mounted to the steering post casing of the vehicle and arranged in electrical communication with the direction indicating signals thereof, a member in the form of an elongated housing rigidly secured to the hub of the steering wheel and extending downwardly therefrom to a point adjacent said contact strips, a resilient member positioned within the housing and having its upper end rigidly secured thereto, the lower free end of said resilient member being provided with a roller adapted to engage with said contacts upon the operation of said steering wheel, said resilient member being so positioned as to be normally out of engagement with said contact strips, and a manually operated lever pivotally connected on said housing and adapted upon rocking movement to flex said resilient member to bring the roller thereof into engagement with said contact strips when the vehicle is turned out of its straight-ahead position.

In testimony whereof I affix my signature.

FRANK C. McELROY.